US012773298B2

(12) United States Patent
Grove et al.

(10) Patent No.: US 12,773,298 B2
(45) Date of Patent: *Oct. 27, 2026

(54) INTERPROXIMAL REDUCTION TEMPLATES

(71) Applicant: Align Technology, Inc., San Jose, CA (US)

(72) Inventors: Bob Grove, San Jose, CA (US); Srinivas Kaza, Mountain View, CA (US)

(73) Assignee: Align Technology, Inc., San Jose, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/540,855

(22) Filed: Dec. 14, 2023

(65) Prior Publication Data

US 2024/0189070 A1 Jun. 13, 2024

Related U.S. Application Data

(63) Continuation of application No. 17/066,119, filed on Oct. 8, 2020, now Pat. No. 11,883,256, which is a continuation of application No. 15/726,243, filed on Oct. 5, 2017, now Pat. No. 10,813,720.

(51) Int. Cl.

| | |
|---|---|
| ***A61C 7/02*** | (2006.01) |
| ***A61C 1/08*** | (2006.01) |
| ***A61C 5/44*** | (2017.01) |
| ***A61C 7/00*** | (2006.01) |
| ***A61C 7/12*** | (2006.01) |
| ***A61C 9/00*** | (2006.01) |
| ***A61C 13/00*** | (2006.01) |
| *A61C 13/34* | (2006.01) |
| *A61C 3/06* | (2006.01) |

(52) U.S. Cl.

CPC ................ *A61C 7/02* (2013.01); *A61C 1/082* (2013.01); *A61C 5/44* (2017.02); *A61C 7/002* (2013.01); *A61C 7/125* (2013.01); *A61C 9/0093* (2013.01); *A61C 13/0004* (2013.01); *A61C 13/0006* (2013.01); *A61C 13/0013* (2013.01); *A61C 13/34* (2013.01); *A61C 3/06* (2013.01)

(58) Field of Classification Search

CPC ........... A61C 7/02; A61C 1/082; A61C 7/002; A61C 7/125; A61C 9/0093; A61C 13/0004; A61C 13/0006; A61C 13/0014; A61C 13/34

See application file for complete search history.

(56) References Cited

U.S. PATENT DOCUMENTS

| | | | | |
|---|---|---|---|---|
| 4,375,965 | A * | 3/1983 | Weissman | A61C 9/0006 433/37 |
| 5,055,039 | A * | 10/1991 | Abbatte | A61C 7/08 433/24 |
| 2001/0041320 | A1* | 11/2001 | Phan | A61C 19/00 433/24 |

(Continued)

*Primary Examiner* — Nicholas D Lucchesi
(74) *Attorney, Agent, or Firm* — Shay Glenn LLP

(57) ABSTRACT

Interproximal reduction guides apparatuses and methods of making and using them are described herein. These interproximal reduction guides apparatuses may include a body that fits over the patient's dental arch and one or more guide slots formed in them configured to limit the motion of an interproximal reduction cutting tool in a defined manner.

19 Claims, 10 Drawing Sheets

(56) References Cited

U.S. PATENT DOCUMENTS

| | | | | |
|---|---|---|---|---|
| 2005/0233276 | A1* | 10/2005 | Kopelman | A61C 7/08 433/3 |
| 2008/0050693 | A1* | 2/2008 | Fischer | A63B 71/085 433/25 |
| 2009/0014013 | A1* | 1/2009 | Magnin | A61F 5/566 128/859 |
| 2013/0071811 | A1* | 3/2013 | Groscurth | A61C 1/084 433/75 |
| 2013/0089828 | A1* | 4/2013 | Borovinskih | A61C 7/36 433/24 |
| 2014/0259488 | A1* | 9/2014 | Rosenberg | A46B 9/045 15/167.2 |
| 2015/0164682 | A1* | 6/2015 | Remmers | A61B 5/4836 600/529 |
| 2016/0310236 | A1* | 10/2016 | Kopelman | G06F 30/00 |
| 2017/0065373 | A1* | 3/2017 | Martz | B33Y 80/00 |
| 2018/0085208 | A1* | 3/2018 | Winter | A61C 9/0006 |
| 2018/0368944 | A1* | 12/2018 | Sato | A61C 7/10 |
| 2019/0152152 | A1* | 5/2019 | O'Leary | B33Y 30/00 |
| 2019/0159877 | A1* | 5/2019 | Sanders | A61C 19/066 |
| 2019/0209267 | A1* | 7/2019 | Massoels | A61C 8/0089 |
| 2019/0314119 | A1* | 10/2019 | Kopelman | A61C 7/10 |
| 2019/0374304 | A1* | 12/2019 | Lopez | A61C 1/082 |

* cited by examiner

INTERPROXIMAL REDUCTION TEMPLATES

CLAIM OF PRIORITY

This application is a continuation of U.S. patent application Ser. No. 17/066,119, filed Oct. 8, 2020, now U.S. Pat. No. 11,883,256, which is a continuation of U.S. patent application Ser. No. 15/726,243, filed Oct. 5, 2017, titled "INTERPROXIMAL REDUCTION TEMPLATES," now U.S. Pat. No. 10,813,720, which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The apparatuses (e.g., devices, systems, etc.) and methods described herein generally related generally to the field of dental treatment. More particularly, described herein are interproximal reduction templates and methods for making and using them.

BACKGROUND

Many dental treatments involve repositioning misaligned teeth and changing bite configurations for improved cosmetic appearance and dental function. Orthodontic repositioning can be accomplished, for example, through a dental process that uses one or more removable positioning appliances for realigning teeth. Repositioning a patient's teeth may result in residual crowding of adjacent teeth due to insufficient space within the patient's mouth. This residual crowding can impede complete tooth alignment. In some situations it may be possible to remove a small portion of a tooth, or portions of two adjacent teeth, in order to make the teeth fit within the space available. The removal of material causing the overlap of the crowded teeth must be treated by the treatment professional by removing material from the surface of one or more teeth in a process called interproximal reduction (IPR). During an IPR procedure, a small amount of enamel thickness on the surface of the teeth is removed to reduce the mesial-distal width and space requirements for the tooth.

However, it may be difficult to create clean, and accurate cutting of tooth surfaces at interproximal areas while avoiding over-cutting, under-cutting and damage to adjacent tissues. For example, a the treatment professional may inaccurately remove material from the surface of the tooth resulting in an undesired tooth shape, a tooth surface that does not fit properly against another tooth, and may potentially have to perform additional IPR procedures and/or other procedures to fix the overlap or newly created underlap.

Described herein are apparatuses and methods that may address these concerns.

SUMMARY OF THE DISCLOSURE

The present invention relates to apparatuses and methods for modifying the interproximal space between a patient's teeth, including interproximal reduction. In particular, described herein are templates, which may also be referred to as jigs, guides, forms, support, or the like, which direct a dental profession in modifying the tissue (e.g., teeth), for example, as part of an interproximal reduction procedure.

For example, described herein are templates that are configured to specifically fit over a patient's existing teeth (e.g., upper and/or lower arch) and act as a guide for removing tissue and/or shaping one or more interproximal spaces between the patient's teeth. The templates may be formed of a material that resists removal, allowing preferential removal of dental tissue. For example, any of the interproximal reduction guide devices descried herein may be formed of a resilient material, such as zirconium or porcelain, that provides a rigid guide for the cutting instrument and that may reduce or eliminate flexing of the cutting tool, such as an interproximal reduction (IPR) disc or similar cutting instrument. The guide may permit clean and equal cutting of tooth structures designated during a treatment process, including in particular a digitally planned treatment process. The interproximal reduction devices described herein may be formed by any appropriate manner, including additive manufacturing (e.g., 3D printing) processes. Alternatively or additionally, the interproximal reduction guide devices described herein may be formed by milling.

Typically, the interproximal reduction guide devices descried herein fit over, and in some cases sit completely over, the occlusal surfaces of the patient's teeth and provide a guide for the interproximal reduction (IPR) cutting, filing or drilling tool, such as an IPR disc, at pre-determined interproximal regions in the patient's dental arch. Any of these apparatuses may also include one or more windows through the interproximal reduction guide apparatus (e.g., interproximal reduction guide device) though which the teeth may be visualized, allowing the dental practitioner to confirm the fit. These inspection windows may be positioned on either side of the interproximal region to be reduced in the interproximal reduction guide device; this may allow the dental practitioner to confirm that the template (interproximal reduction guide device) is seated correctly on the patient's dentition.

The interproximal reduction guide apparatuses described herein may be designed using a model, including a digital model, a three-dimensional surface mode, and/or a physical model of the patient's teeth (e.g., dental arch). The guide maybe configured to fit securely over the patient's teeth and to provide one or more guide slots that have a width and depth that limits a cutter (e.g., an IPR cutting disc) of a generic or predetermined size to cutting a predetermined amount, depth and shape from the interproximal region, which may avoid gingival abrasion and parallel surfaces of interproximal contact. In general, the guide slots can be at any angle (e.g., any angle tangential to the plane of the teeth), including 90 degrees+/−about 45 degrees (e.g., +/−about 40 degrees, +/−about 35 degrees, +/−about 30 degrees, +/−about 25 degrees, +/−about 20 degrees, +/−about 15 degrees, +/−about 10 degrees, etc.). Any of the apparatuses described herein may have one or more guide slots (e.g., 2, 3, 4, 5, 6, 7, 8, 9, 10, 11, 12, etc.).

For example, described herein are interproximal reduction guide devices having: a body configured to fit over the patient's dental arch, the body comprising an inner channel forming a plurality of chambers configured to conform to an outer surface of a patient's teeth, wherein the body further comprises a lingual surface, a buccal surface, and an occlusal surface; and a guide slot extending through the body from the occlusal surface and at least partially into the buccal and lingual surfaces, and into the inner channel between two of the plurality of chambers, wherein the guide slot is configured to limit the motion of an interproximal reduction tool inserted into the guide slot.

The body may be customized to the patient's teeth.

The guide slot may be configured to extend in a plane through the body from the occlusal surface and at least partially into the buccal and lingual surfaces. The guide slot may be a slit or cut-out region that is typically narrow (e.g., has a length much larger than the width). The width is typically wider than the width of the cutting tool (e.g., an IPR disc), and/or may have a variable (e.g., hourglass, v-shaped, etc.) profile. For example, the guide slot may have a tapered profile having a larger diameter width through the buccal surface. The guide slot may have an hourglass profile having a narrower diameter width region midway down the buccal and lingual surfaces. The base of the guide slot (e.g., closest to the gingiva when worn) may be reinforced, and/or the entire guide slot may be reinforced, including thickened, coated, or framed in a material that resists cutting of the cutting tool.

Any of the interproximal reduction guide devices described herein may include one or more widows through the body (e.g., the occlusal surface of the body) to allow visualization. For example, any of these devices may include a plurality of windows through the body into the inner channel, configured to allow visualization of the patient's teeth within the body. Any of these apparatuses may include a first window through the body into the inner channel on a first side of the guide slot and a second window through the body into the inner channel on a second side of the guide slot, wherein the first and second windows are configured to allow visualization of the patient's teeth within the body.

One or more, e.g., a plurality, of guide slots may be included. In general, the body may comprise a material that resists cutting by the interproximal tool. For example, the body may be formed of zirconium or porcelain, or any other material that will resist cutting by the cutting tool.

For example, described herein are interproximal reduction guide device comprising: a body configured to fit over the patient's dental arch, the body comprising an inner channel forming a plurality of chambers configured to conform to an outer surface of a patient's teeth, wherein the body further comprises a lingual surface, a buccal surface, and an occlusal surface; a guide slot extending in a plane through the body from the occlusal surface and at least partially into the buccal and lingual surfaces, and into the inner channel between two of the plurality of chambers, wherein the guide slot is configured to limit the motion of an interproximal reduction tool inserted into the guide slot; a plurality of windows through the body into the inner channel, configured to allow visualization of the patient's teeth within the body.

Also described herein are methods of forming an interproximal reduction guide (e.g., an interproximal reduction guide device). For example, a method of forming an interproximal reduction guide may include: receiving a model of the patient's dental arch; generating an interproximal reduction guide from the model of the patient's dental arch, wherein the interproximal reduction guide comprises a body forming an inner channel comprising a plurality of chambers configured to conform to an outer surface of the patient's teeth, further wherein the body comprises a guide slot extending in a plane through the body from an occlusal surface and at least partially into a buccal surface and a lingual surface, between two of the plurality of chambers, wherein the guide slot is configured to limit the motion of an interproximal reduction tool inserted into the guide slot; and providing the interproximal reduction guide to a physician.

In any of the methods described herein, generating may include generating the interproximal reduction guide from a digital model of the patient's dental arch. The digital model (e.g., a scan of the patient's dentition) may be used to determine interproximal spacing by manipulating the model, and this manipulated model may be used to generate the interproximal reduction guide device by determining where and how big (depth, width, etc.) the interproximal cuts should be made to reduce the interproximal spacing. In some variations, internal structures (e.g., enamel thickness, dentin locations, dental carries, etc.) may be used to plan the interproximal reductions to be made and therefore the configuration of the interproximal reduction guide device. Thus, any of the methods described herein may include scanning the patient's teeth and determining an interproximal spacing, including internal scanning, such as x-rays (including three-dimensional X-rays), direct and/or indirect structured light, lasers, destructive scanning, computer-aided tomographic images or data sets, magnetic resonance images, intra-oral scanning technology, photographic reconstruction, and/or other imaging techniques.

Generating may also include forming the interproximal reduction guide from a stiff material that is configured to resist cutting by the interproximal reduction tool (e.g., ceramic, zirconium, porcelain, etc.).

Generating may include forming a plurality of windows through the body into the inner channel to allow visualization of the patient's teeth within the body. The one or more windows, including windows on either side of a guide slot, and/or may be through the occlusal surface (and may be limited to the occlusal surface and/or the occlusal surface and the uppermost portion of the lingual and/or buccal sides). The windows may be directly fabricated or may be cut out from the body. As mentioned above, generating may include fabricating the interproximal reduction guide by one or more of: milling and three-dimensional (3D) printing.

In general, any of these methods may include forming the guide slot through the body, including forming the guide slot so that the guide slot has a tapered profile having a larger diameter width through the buccal surface. Generating may comprise forming a plurality of guide slots through the body.

Also described herein are methods of treating a patient using any of the interproximal reduction guides described. For example, a method of treating a patient may be a method of enlarging a patient's interproximal space, and may include: placing an interproximal reduction guide device onto the patient's dental arch so that that the patient's teeth are secured within an inner channel of the interproximal reduction guide device; inserting an interproximal reduction tool into a guide slot in the interproximal reduction device; and operating the interproximal reduction tool within the guide slot to remove enamel from a region between two teeth, wherein the guide slot limits the movement of the interproximal reduction tool.

Any of these methods may also include confirming that the interproximal reduction guide device is secured over the patient's teeth by observing the patient's teeth through one or more windows through the interproximal reduction guide device.

The methods may also include smoothing the interproximal region between two teeth through the guide slot. Smoothing may be performed through the guide slot using the same tool used to cut the teeth, or using a different tool.

The guide slot may be configured to allow smoothing, for example, by including a tapered guide slot, as described above.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A shows excessive removal of tooth surface in an image of a patient's tooth taken from above, while FIG. 1B shows a poor interproximal reduction that resulted in a gouged area of a patient's teeth.

FIG. 3A shows a lateral perspective view of the prototype interproximal reduction guide apparatus, while FIG. 3B shows a more frontal perspective view of the prototype interproximal reduction guide apparatus.

In FIG. 4A, the apparatus includes both the body region that is configured to conform (on the inner, tooth-facing surface) to the patient's current dentition, so that it may seat snugly over the teeth. The interproximal reduction guide apparatus in FIG. 4A includes a single slot or guide (guide slot) that extends through the occlusive surface and down toward the gingiva through the buccal and lingual surfaces (though a minimum region, e.g., of diameter greater than 0.5 mm, 1 mm, 1.5 mm, 2 mm, etc.) is left on the body between the gingiva and the slot. The example interproximal reduction guide apparatus shown in FIG. 4A also includes a plurality of windows passing though the body, allowing visualization of the surfaces of teeth (e.g., occlusal, lingual, and/or buccal), including teeth on either side of the interproximal region to be cut. These windows may allow the dental practitioner to confirm that the prototype interproximal reduction guide apparatus is properly and fully seated in the chamber(s) formed by the body of the device to hold the teeth. The interproximal reduction guide apparatus shown in FIG. 4B is similar to FIG. 4A, but does not include the windows.

In FIG. 4C, the apparatus includes a body region that is configured to conform (on the inner, tooth-facing surface) to the patient's current dentition, showing an inner channel region (channel) forming a plurality of chambers configured to conform to an outer surface of a patient's teeth, so that it may seat snugly over the teeth. The interproximal reduction guide apparatus in FIG. 4C includes a slot or guide (guide slot) that extends through the occlusive surface and down toward the gingiva through the buccal and/or lingual surfaces. In FIG. 4C, the slot is shown extending down the buccal side. In some variations the slot may extend completely down one or the other of the buccal and lingual sides, leaving a minimum region on the body between the gingiva and the slot. The example interproximal reduction guide apparatus shown in FIG. 4C also includes a plurality of windows though the body, allowing visualization of the surfaces of teeth (e.g., occlusal, lingual, and/or buccal), including teeth on either side of the interproximal region to be cut. The interproximal reduction guide apparatus shown in FIG. 4D is similar to FIG. 4C, but does not include the windows.

In FIG. 7A, the interproximal reduction guide apparatus is shown by itself, in a front view including a guide slot. In this example, the guide slot is tapered, having a roughly hourglass shape. This middle tapered region may allow tilting of the IPR tool to shape the IPR reduction slightly.

DETAILED DESCRIPTION

In general, described herein are methods and apparatuses for reducing a patient's interproximal dental region in a controlled and precise manner. Embodiments may include interproximal reduction (IPR) guides or templates, as well as methods of using and making them, including computing device related, system, and method embodiments for interproximal reduction.

Reference is made herein to the accompanying drawings that form a part hereof, and in which is shown by way of illustration how a number of embodiments of the disclosure may be practiced. These embodiments are described in sufficient detail to enable those of ordinary skill in the art to practice a number of embodiments of this disclosure, and it is to be understood that other embodiments may be utilized and that changes may be made without departing from the scope of the present disclosure. Elements shown in the various embodiments herein can be added, exchanged, and/or eliminated so as to provide a number of additional embodiments of the present disclosure. The proportion and the relative scale of the elements provided in the figures are intended to illustrate the embodiments of the present disclosure, and should not be taken in a limiting sense. As used herein, “a”, “at least one”, “a number of” something can refer to one or more such things.

The methods and apparatuses described herein may be used in any dental procedure (including an orthodontics and orthognathic procedures). Dental treatment professionals, such as a clinician, dentist or orthodontist, may select a treatment plan for a patient’s teeth based upon experience with certain types of physical features and/or appliances. A dental treatment plan can include orthodontic treatment planning functions and/or appliances. Interproximal reduction (IPR) procedures may be done at the end of a dental treatment, in the midst of a dental treatment, or more preferably at the start (or before starting) a dental treatment. A treatment professional can establish a treatment plan having a target position for a number of teeth of a particular patient. With this target position in mind, a first tooth and a second tooth needing IPR can be identified and IPR can be virtually planned at a point during the process of moving the teeth to the target position that is desirable for performing IPR.

Figure 1A:
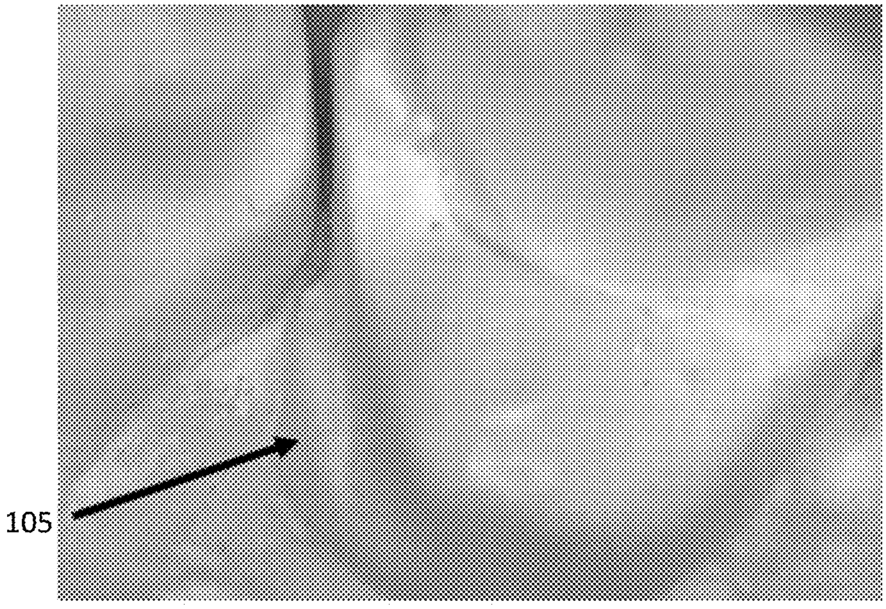
FIGS. 1A and 1B show examples of poor interproximal reduction, as may be performed currently in the absence of any of the interproximal reduction guide apparatuses described herein.
Figure 1B:
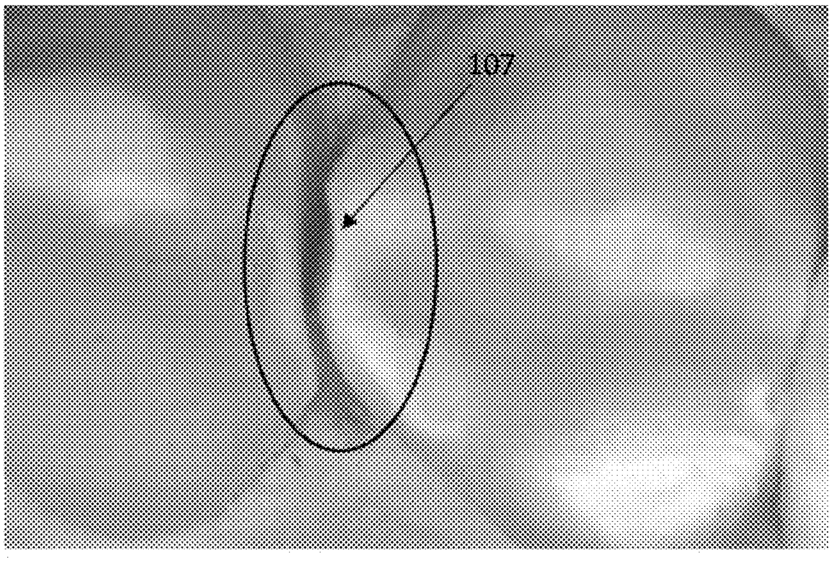
Figure 2A:
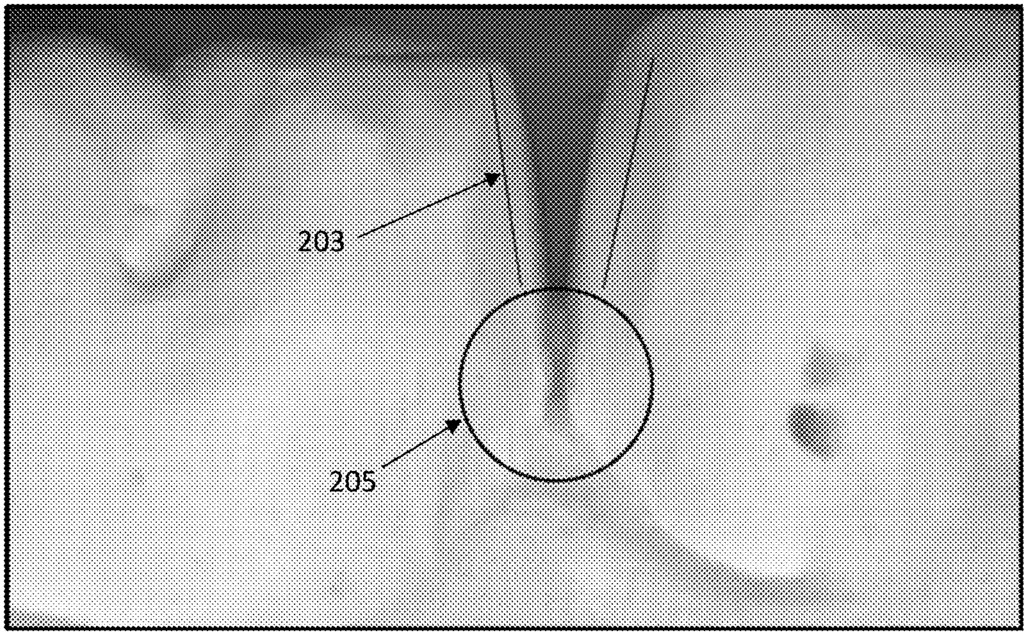
FIG. 2A is another example of a poor interproximal reduction, having a tapered contour likely due to flexing of the IPR cutting tool (disc).

FIGS. 1A-1B and 2A show examples of IPR performed as is currently typical in the art. In general, a dental professional may use an IPR cutting tool, such as an IPR cutting disc, e.g., diamond disc, to cut between the patient’s teeth. Depending on the steadiness of their hand, as well as their manual dexterity, the dental professional may typically cut based on the amount that they feel, by visual observation, to be a sufficient amount. However these techniques typically lack precision, and may lead to poor reductions. For example, FIG. 1A shows an example of an IPR in which an excessive amount of tooth surface was removed, leaving a lip or edge on the patient’s tooth 105. Similarly, in FIG. 1B, the IPR resulted in a poor final contact; interproximal contact is not made between these two teeth, due to a gouged area on the mesial surface of the bicuspid 107.

Figure 2B:
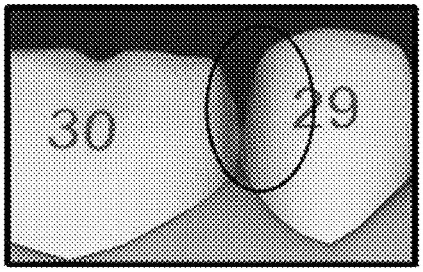
FIGS. 2B and 2C illustrate interproximal regions that may be widened by interproximal reduction.
Figure 2C:
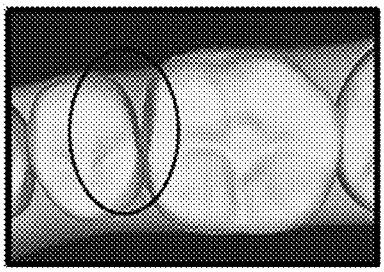

FIG. 2A shows an IPR having an undesirable tapered shape 203, resulting in interproximal contact at the gingiva 205. In this example, flexing of the diamond disc (IPR disc) created a tapered interproximal contour. Thus, the contact for these teeth, even after orthodontic correction, will likely be at the gingival area and not in normal interproximal contact surface. A digital representation of the teeth, as shown in FIGS. 2B and 2C (showing lingual and occlusal sides of the teeth, respectively) may instead be used to plan IPR.

Digital dental models from a scan of a patient’s dentition can be provided with computer-aided design and/or manufacturing systems, including tooth-treatment systems. A digital dental model representing an initial tooth arrangement may be obtained in a variety of ways. For example, the patient’s teeth may be imaged to obtain digital data using direct and/or indirect structured light, X-rays, three-dimensional X-rays, lasers, destructive scanning, computer-aided tomographic images or data sets, magnetic resonance images, intra-oral scanning technology, photographic reconstruction, and/or other imaging techniques. The digital dental model can include an entire mouth tooth arrangement, some, but not all teeth in the mouth, and/or it can include a single tooth.

A positive model and/or negative impression of the patient’s teeth or a tooth may be scanned using an X-ray, laser scanner, destructive scanner, structured light, and/or other range acquisition system to produce the initial digital dental model. The data set produced by the range acquisition system may be converted to other formats to be compatible with the software which is used for manipulating images within the data set, as described herein.

Interproximal Reduction Guides

In general, an interproximal reduction apparatus (e.g., device, system, etc.) may include a rigid or flexible (or semi-rigid) body that fits over the patient’s dental arch. The body typically includes an inner channel forming a plurality of chambers that is configured to conform to an outer surface of a patient’s teeth. This channel is therefore typically customized to the patient’s teeth, and may be generated from a model of the patient’s dentition (e.g., a digital model or a physical model). The body includes a lingual surface, a buccal surface, and an occlusal surface that correspond to the portion of the body that will contact the lingual, buccal and occlusal surface of the patient’s teeth when the body is worn over the patient’s teeth.

The interproximal reduction apparatus also typically includes one or more guide slots extending through the body from the occlusal surface (e.g., top) and at least partially into the buccal and lingual surfaces, and into the inner channel between two of the plurality of chambers, corresponding to an interproximal space between two of the patient’s teeth. The guide slot is configured to limit the motion of an interproximal reduction tool inserted into the guide slot.

Generally, at least the region around the guide slot may be resistant to cutting by the IPR cutting tool. In some variation the entire interproximal reduction apparatus is formed of a material that is strong enough to resist cutting by the IPR cutting tool. For example, the material around the cutting slot and/or the entire interproximal reduction apparatus may be formed of a material that is more resistant to cutting than the teeth (e.g. than enamel). The interproximal reduction apparatus and/or at least the region around the guide slot of the interproximal reduction apparatus may be made out of a ceramic, e.g., a zirconium, a porcelain, etc. As described herein, the apparatus may include regions (including coatings, layers, reinforcements, frames, etc.) having different mechanical properties, which may provide stiffer, stronger, or more resistant to cutting than other regions. For example, the bulk of the body of the apparatus may be formed of a relatively flexible material allowing the device to be easily applied over the patient’s teeth; the region surrounding the guide slot may be reinforced and/or formed out of a material that is stiffer and/or more resistant to cutting. In some variations, other regions of the body of the apparatus may also be reinforced to limit flexing or dislodging the body of the apparatus from the teeth during cutting. For example, a perimeter of the body may include a reinforcing band extending all or partially around.

The body region may extend over the entire dental arch, or it may extend over just a portion of the patient’s dental arch. Typically, interproximal reduction apparatus will hold onto the dental arch securely, to prevent moving when cutting. Thus, the interproximal reduction apparatus may be configured to fit snugly onto the patient’s teeth, to avoid dislodging. In addition, the interproximal reduction apparatus may include one or more indicators for indicating that the interproximal reduction apparatus is secured properly on the patient’s teeth. For example, any of the interproximal reduction apparatuses described herein may include one or more windows through the interproximal reduction apparatus body, particularly over at least a portion of the occlusal surface to allow the dental practitioner to confirm that the interproximal reduction apparatus is fully seated on the patient’s teeth. In particular, the interproximal reduction apparatus may include windows through the body (e.g., the occlusal surface) on either side of the guide slots.

Figure 3A:
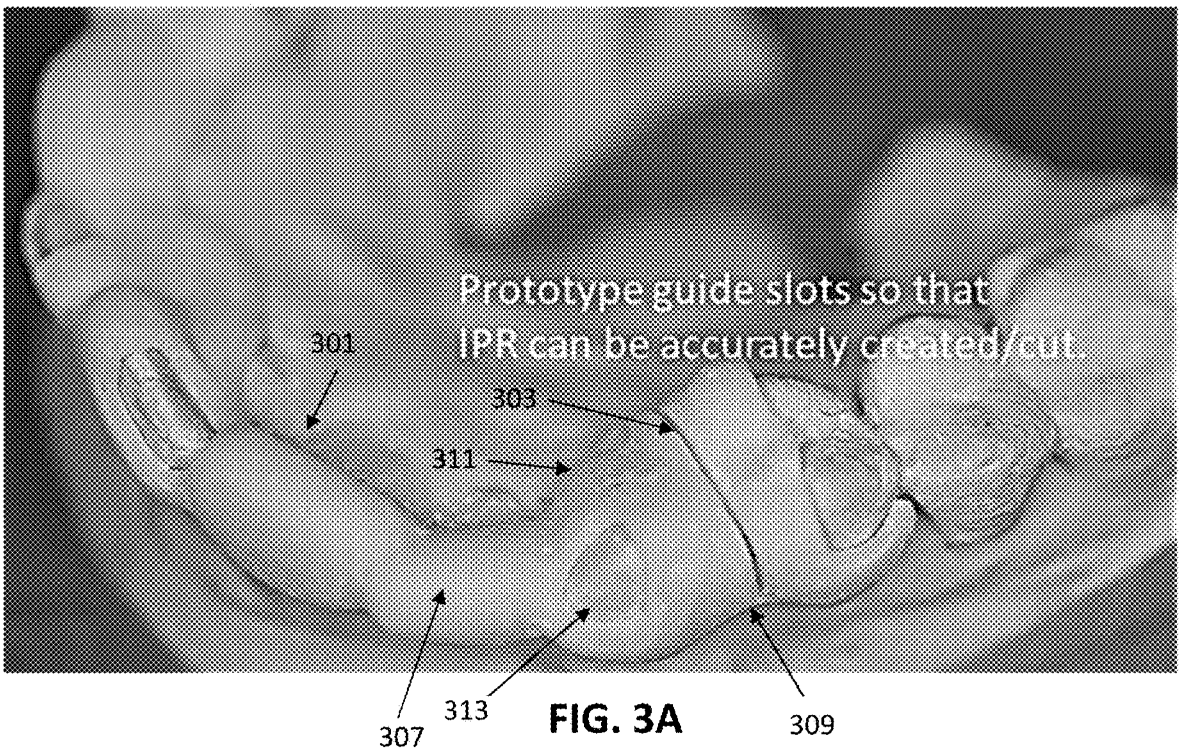
FIGS. 3A-3B illustrate a prototype interproximal reduction guide apparatus, shown worn on a model of a patient's teeth. The model interproximal reduction guide device includes a guide slot extending through the body from the occlusal surface and at least partially into the buccal and lingual surfaces. This example also includes a plurality of windows through the body showing a portion of the occlusal surface through the window.
Figure 3B:
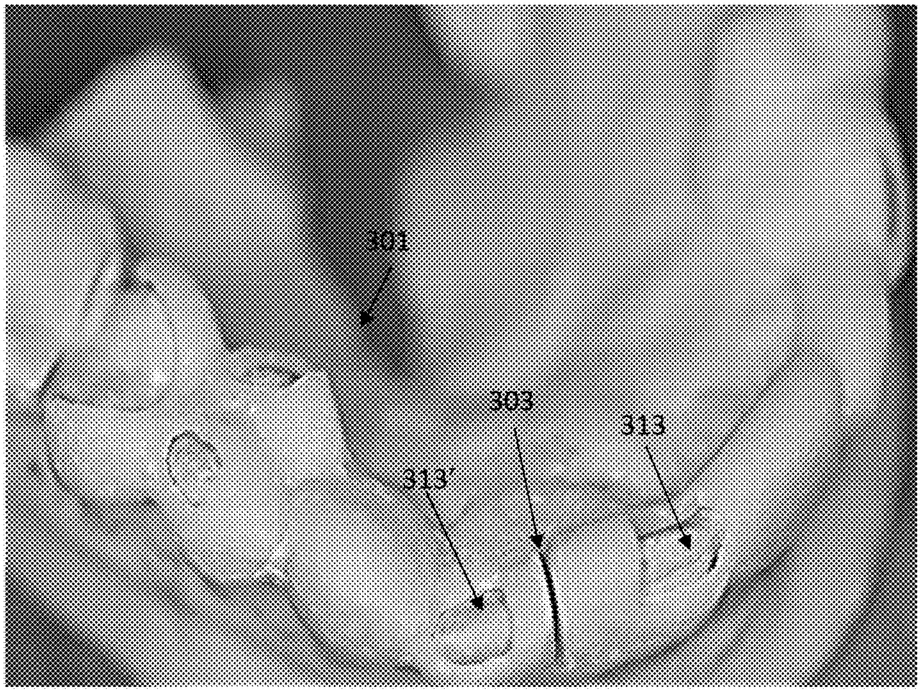

FIGS. 3A and 3B illustrate prototype interproximal reduction apparatuses attached over a model of a patient's teeth. In FIG. 3A, the interproximal reduction apparatus forms a template that has at least one slot (guide slot) formed through the body that is placed over the teeth. The slot extends in a plane from the occlusal surface, between two chambers of the channel (corresponding to the interproximal region between adjacent teeth) and partway down the buccal and lingual sides. The distance that the slot extends down the buccal and lingual sides may be equal, or it may be unequal (e.g., the guide slot may extend further down the lingual side than the buccal side or further down the buccal side). The guide slot may guide the reduction tool(s) to cut appropriate designed IPR from treatment. The guide slot may be configured to prevent jamming of the IPR cutting tool, and may generally have a minimum width that is larger than the maximum width of the cutting blade (e.g., disc) of the IPR cutting tool. As will be described in further detail, below, the width may be constant (e.g., forming a uniform slot) or may be different along the length (e.g. forming a V, an inverted V, an hourglass, etc.), depending on the shape of the IPR to be performed.

As mentioned above, the guide slot may extend partially down the lingual and/or buccal sides, leaving a minimum separation distance between the end of the guide slot and the gingival-facing edge of the body of the apparatus. Alternatively, one of the lingual or buccal sides of the guide slots may extend completely down to the edge of the apparatus. In general, the length of the slot extending down (through) the lingual side may be different from the length of the slot extending down (through) the buccal side.

In FIG. 3A, the interproximal reduction apparatus includes a body 301 showing a single guide slot 303 cut through the occlusal surface 307 and down the buccal 309 and lingual 311 sides. In the prototype apparatus shown in FIG. 3A, the body includes a plurality of windows 313 through the body, showing portions of the occlusal surface of the patient's teeth when the device is worn. The dental professional may confirm that that the device is worn when the occlusal surface reaches the top (e.g., extends through) the widows. Multiple windows may be placed along the length of the body to allow confirmation that it is fully seated.

FIG. 3B shows another example of the prototype interproximal reduction apparatus body 301, having a guide slot 303 that is also flanked by two windows 313, 313' through the occlusal surface of the apparatus.

Figure 4A:
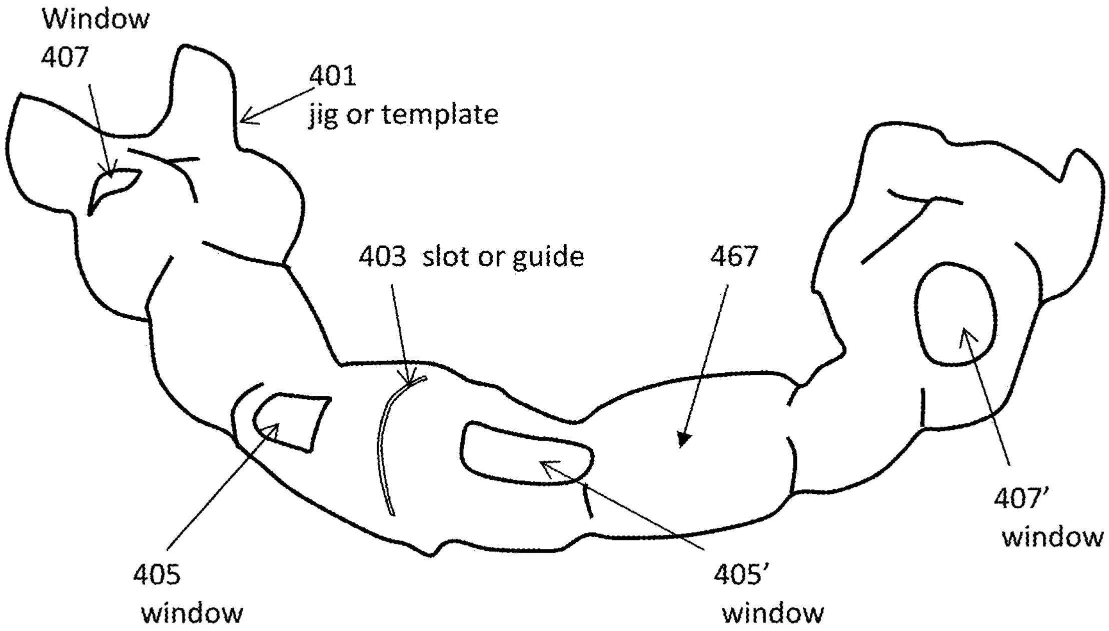
FIGS. 4A-4B illustrate examples of interproximal reduction guide apparatuses.
Figure 4B:
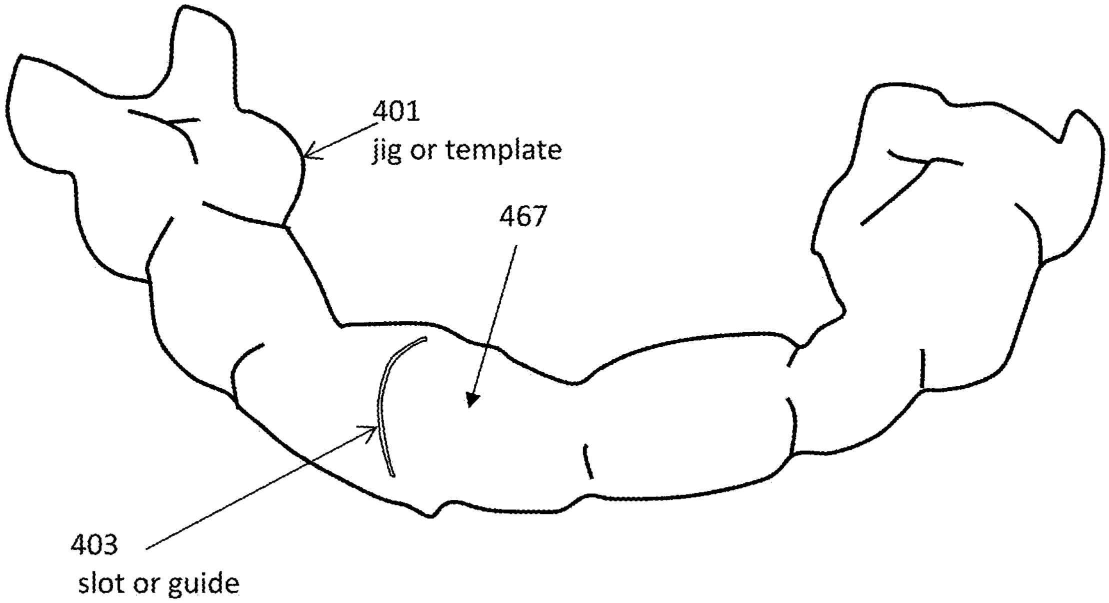

Another illustration of an interproximal reduction apparatus is shown in FIG. 4A, showing the outer surface of the interproximal reduction apparatus body 401. As in FIG. 3A, this example also includes a plurality of windows 407, 407', 405, 405', and a guide slot 403. In this example, the guide slot 403 is also flanked by ta pair of windows 405, 405', as shown. This interproximal reduction apparatus is also configured to fit over substantially all of the patient's dental arch. The guide slot 403 passes through the buccal surface 467. The example interproximal reduction apparatus shown in FIG. 4B is similar to the interproximal reduction apparatus shown in FIG. 4A, but does not include the windows. Alternatively or additionally, another indicator of contact, such as one or more contact sensors) may be used.

Figure 4C:
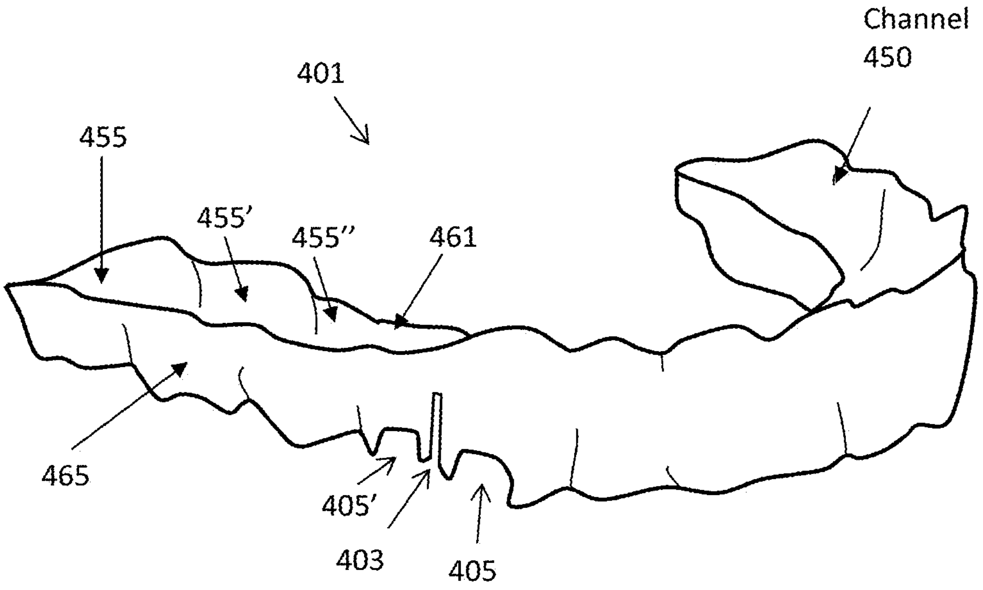
FIGS. 4C and 4D illustrate top front perspective views of examples of interproximal reduction guide apparatuses.
Figure 4D:
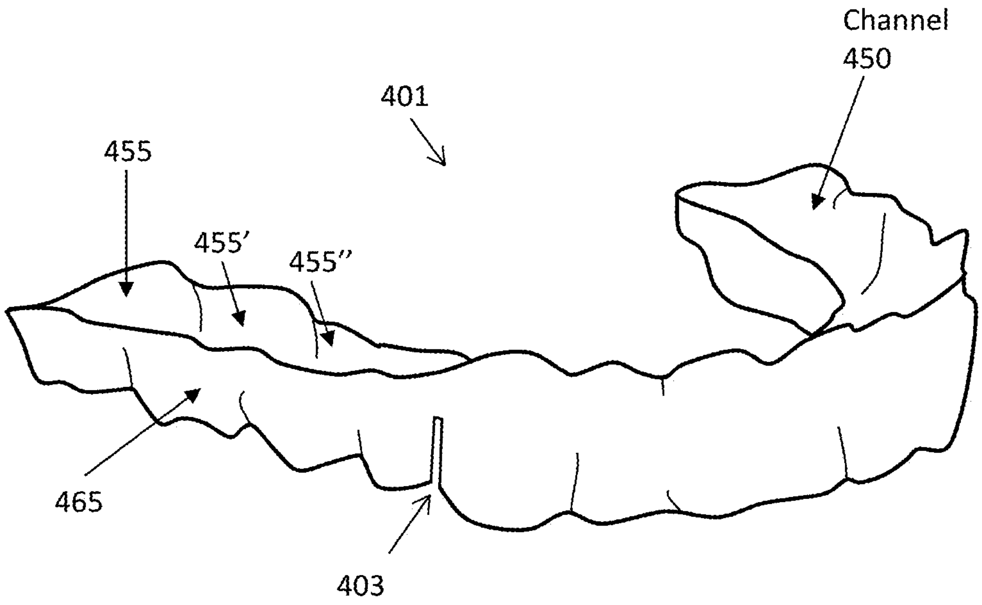

FIGS. 4C and 4D illustrate another example of an interproximal reduction apparatus, shown from the bottom side. In FIG. 4C, the body of the apparatus is configured to fit over at least a portion of the patient's dental arch (in this example, the entire upper dental arch). In FIG. 4C, the body includes an inner cavity (e.g., channel 450) that has a plurality of connected, adjacent chambers 455, 455', 455" that are each configured to substantially conform to an outer surface of the patient's teeth so that the device may be worn snugly over the patient's teeth. The body also includes a pair of buccal openings (windows 405, 405') that allow the user to visually confirm that the device is snugly fit over the teeth.

In general, the inner cavity or channel does not necessary have to be continuous; for example, there channel may be discontinuous where there is a gap in the teeth, etc. The apparatus may be configured to fit over just a portion of the dental arch (e.g., just the left and/or right molars, just the left and/or right incisors, just the left and/or right canines, the front teeth, the left-side teeth, or any combination of these). In this example, the body 401 includes a lingual surface 461, a buccal surface 465, and an occlusal surface (not visible). In this example, the guide slot 403 extends through the body 401 from the occlusal surface and at least partially into the buccal and lingual surfaces, and passes into the inner channel between two of the plurality of chambers, and the guide slot limits the motion of an interproximal reduction tool inserted into the guide slot. The guide slot may be configured to limit the motion of the IPR tool, for example, by having at least a peripheral region that is more difficult to cut than the enamel, so that the tool preferentially cuts the enamel.

Similarly, FIG. 4D shows another example of an interproximal reduction apparatus (e.g., shown as a device) that includes a body 401 configured to fit snugly onto the patient's teeth and conform to the outer surface of the teeth. In this example, as shown in FIG. 4C, the body includes an inner opening forming a cavity or channel 455 having a plurality of adjacent chambers 455, 455', 455" that conform to the teeth so that the body can fit snugly onto the teeth. In the example shown in FIG. 4D, the interproximal reduction device does not include windows, as described above.

Figure 5:
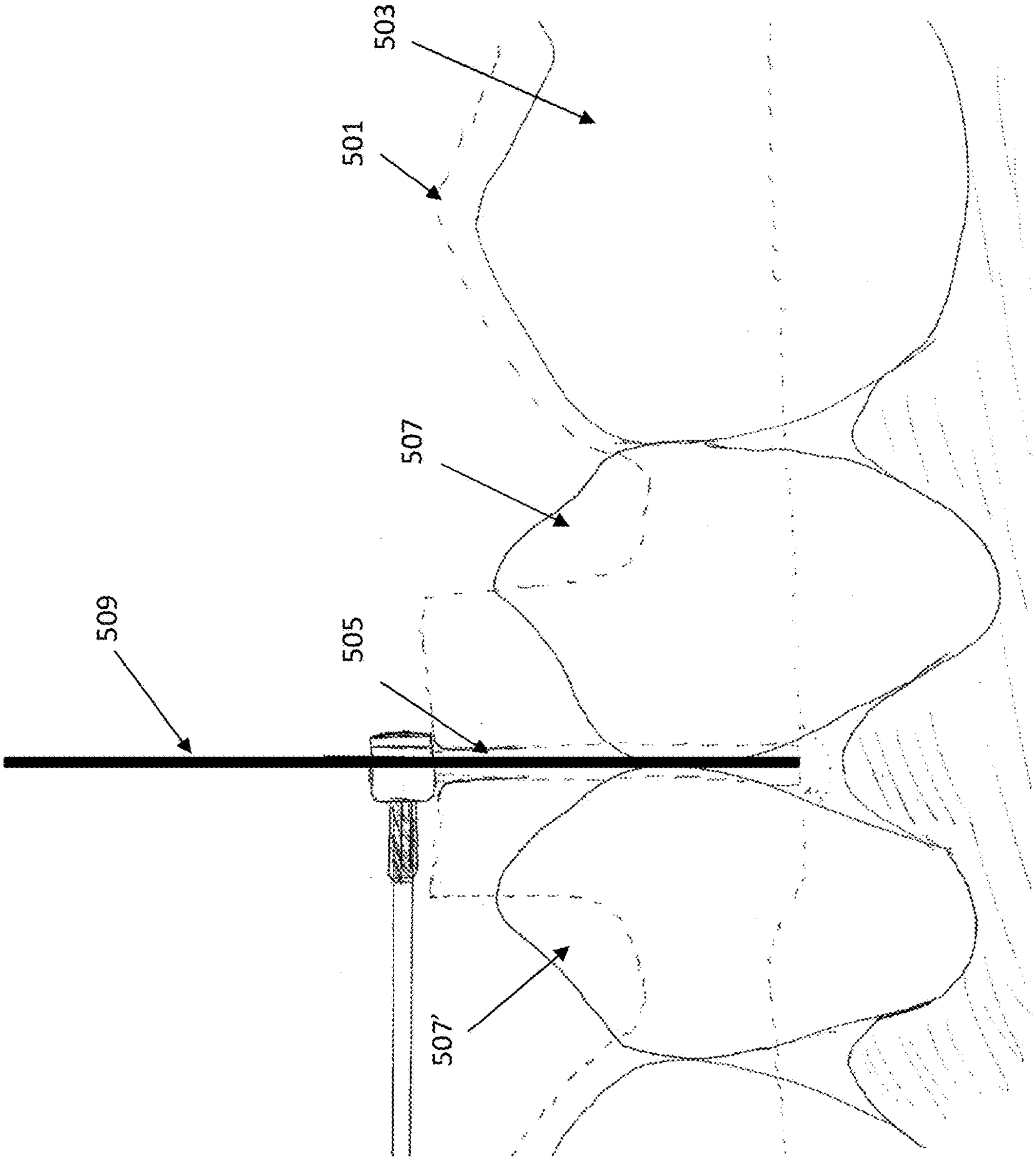
FIG. 5 is a side perspective view of a method of using an interproximal reduction guide apparatus to treat a patient's teeth. In this example, the interproximal reduction guide apparatus includes a guide slot into which a cutting tool (e.g., rotary IPR disc) can be inserted to reduce the interproximal region as permitted by the guide. The sides of the guide slot limit the cutting by the cutting tool.

In operation, the guide slots typically guide and limit the cutting by an IPR cutting tool. For example, FIG. 5 shows a side view of an interproximal reduction apparatus 501, show by the dashed line, worn on a patient's teeth 503, in which the interproximal reduction apparatus has a single planar slot 505 extending from the occlusal surface partially down the buccal and lingual sides of the body of the interproximal reduction apparatus. The interproximal reduction apparatus also include windows 507, 507' showing the seating of the patient's teeth. An IPR cutting tool (e.g., diamond disk) 509 is shown in the guide slot 505, removing tooth material. The guide slot limits the movement of the IPR cutting tool, preventing it from cutting the wrong place or into the gingiva, etc. The plane of the IPR cutting tool fits into the plane of the guide slot formed into the body of the interproximal reduction apparatus.

Figure 6A:
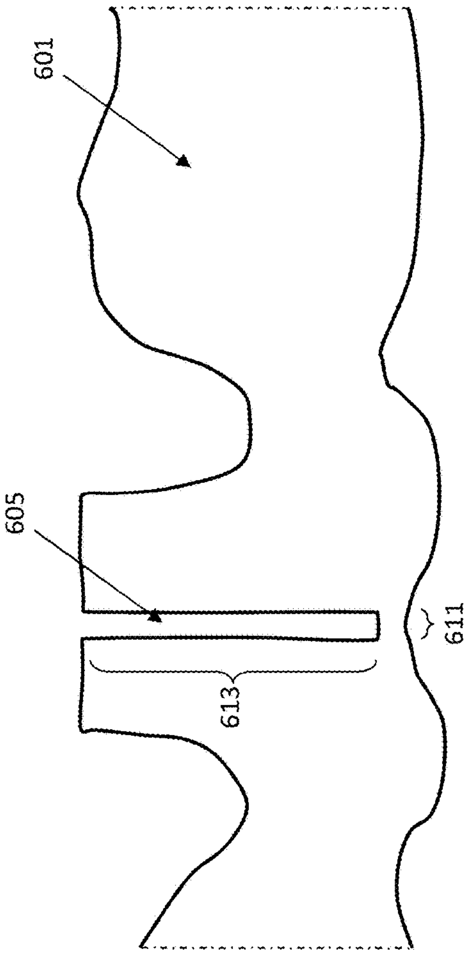
FIG. 6A shows another partial front view of an interproximal reduction guide apparatus, showing a guide slot and a pair of adjacent windows.
Figure 6B:
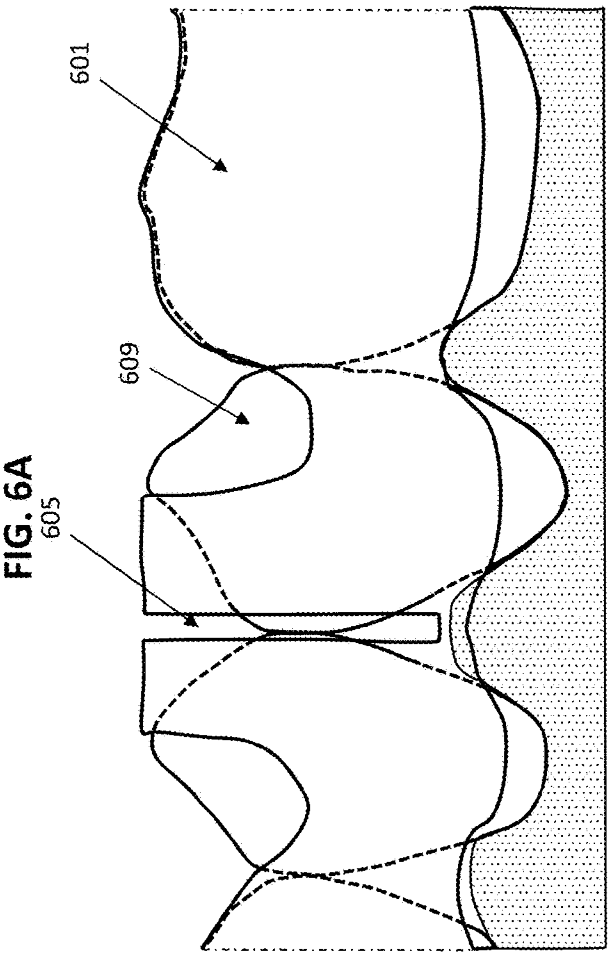
In FIG. 6B the interproximal reduction guide apparatus of FIG. 6A is shown properly seated on a patient's teeth (e.g., the lower dental arch). The proper seating may be confirmed by visualizing the teeth in the windows on either side of the guide slot. A tool (e.g., IPR disc) may be used to remove the IPR portion of the teeth visible in the slot.

FIG. 6A shows another example of an interproximal reduction apparatus 601, not connected to a patient's teeth. This example, similar to that shown in FIG. 5, shows a guide slot 605 that has a width 611 and a height 613, where the width is much smaller than the height. The width of the slot in this example is constant, though, as described below in reference to FIG. 7A-7B, it may have a varying profile. FIG. 6B shows the apparatus of FIG. 6A applied to a patient's teeth 609. The width of the guide slot may be any appropriate width (e.g., the guide slot may have a maximum width of between 0.1 mm and 5 mm (e.g., between 0.5 mm and 3 mm, less than 5 mm, less than 4 mm, less than 3 mm, less than 2 mm, less than 1 mm, etc.). The maximum width may refer to the width of the guide slot along either or both the lingual and buccal sides.

In general, in any of the apparatuses described herein, the dimension and position of the guide slot may be determined, e.g., by a dental professional, based on the esthetic considerations for the teeth. For example, the size of the guide slot (minimum width, shape, etc.) may be selected based on how much of the tooth (e.g., the enamel) to remove in one or both adjacent teeth. The center position of the guide slot on the body of the apparatus may be slightly offset from the separation between the teeth to be reduced, so that more reduction is done one tooth relative to the adjacent tooth. The apparatuses described herein may be particularly useful in this regard, as they may make such asymmetric reductions both relatively easier and more precise than freehand reductions. For example, the guide slot 605 shown in FIG. 6B is offset from the existing space between the two adjacent teeth.

Figure 7A:
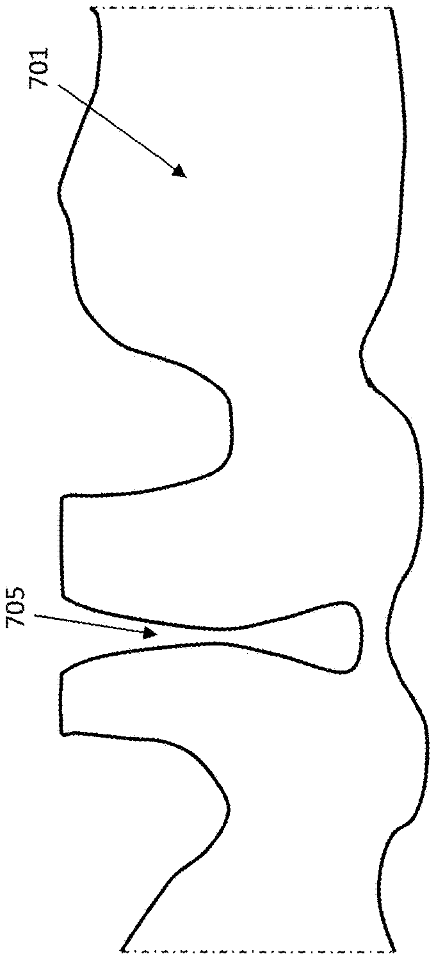
FIGS. 7A-7B illustrate another example of an interproximal reduction guide apparatus similar to that shown in FIGS. 6A and 6B.
Figure 7B:
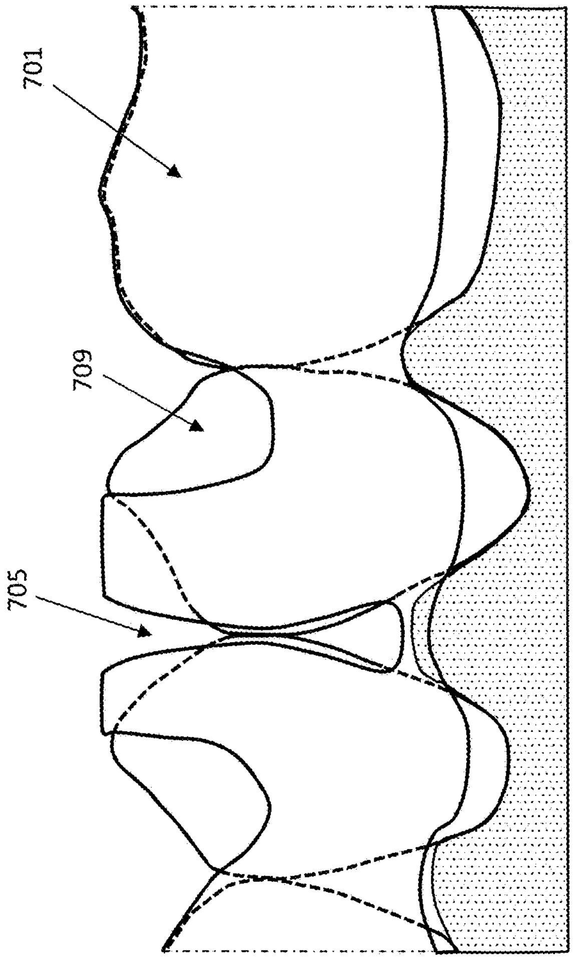

The portion of the interproximal reduction apparatus 701 shown in FIG. 7A also includes a guide slot 705, however this guide slot has a width that is not constant down the length of the slot. Although the slot still forms a plane that cuts through the body of the interproximal reduction apparatus, the width of the slot on the lingual and buccal sides of the interproximal reduction apparatus is tapered to form an hourglass shape. This tapered shape will allow the IPR cutting tool to insert into the slot, but will also permit the cutting tool to tilt in a prescribed angle (e.g., an angle prescribed by the profile of the guide slot). This may allow the space between the teeth 709 to be shaped.

Figure 8:
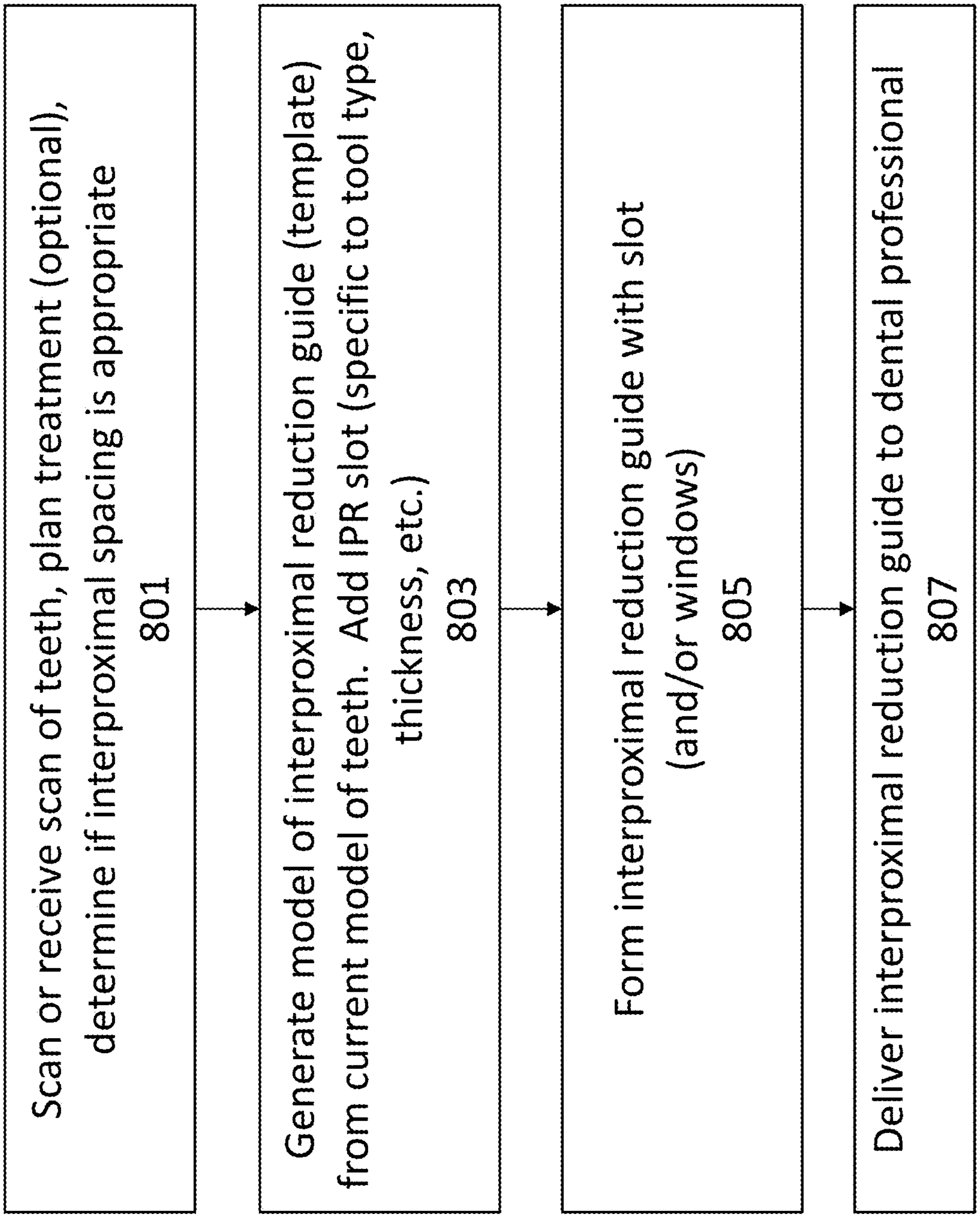
FIG. 8 is a flow chart schematically illustrates one method of forming an interproximal reduction guide apparatus.

As mentioned above the interproximal reduction apparatuses described herein may be formed as part of a treatment plan. Sec, e.g., U.S. Pat. No. 9,433,476, herein incorporated by reference in its entirety. For example, FIG. 8 outlines one example of a method of forming an interproximal reduction guide apparatus. In this example, the method may first include receiving a model of the patient's teeth 801 (e.g., the patient's dental arch), typically in a processor that may allow manipulation and visualization (e.g., display) of a three-dimensional model of the patient's teeth. This model may be used to plan a treatment for the teeth, including an orthodontic or other dental treatment, such as aligning or moving the teeth. Where it is determined that the teeth spacing should be adjusted by interproximal reduction, e.g., to improve clearance and/or spacing between the teeth, the processor (as part of a system, for example) may determine where and how much IPR should be performed on the patient's teeth.

Once the practitioner determines, on the model, where and how much IPR will be performed, an interproximal reduction guide apparatus may be generated 803. The interproximal reduction guide apparatus may, as described above, act as a template, and is generated from the model of the patient's dental arch. The interproximal reduction guide typically includes a body forming an inner channel comprising a plurality of chambers configured to conform to an outer surface of the patient's teeth. Thus, the body of the interproximal reduction guide apparatus is configured specifically to fit snugly to the patient's dental arch, based on the model (e.g., scan) of the patient's teeth. The method also includes forming one or more guide slots into the body 805. Note that the step of generating the model and forming the guide slots may be a single step, for example, when the interproximal reduction guide apparatus is generated by a 3D printing technique. Alternatively, the guide slot may be cut into the body. The guide slots typically extend in a plane through the body of the interproximal reduction guide apparatus from an occlusal surface and at least partially into a buccal surface and a lingual surfaces, between two of the plurality of chambers. The guide slot is configured to limit the motion of an interproximal reduction tool inserted into the guide slot. Once the apparatus is formed, it may be delivered to the dental professional 807 (e.g., provided to a physician, dentist, orthodontist, etc.), who may then use it as part of a dental procedure.

In practice, interproximal reduction may be performed during any part of a treatment plan, before, during and/or after moving the teeth via an orthodontic appliance, including (but not limited to) an aligner. For example, a dental practitioner may prefer to perform IPR at the beginning of a treatment processed, or a few stages into the treatment process (e.g., after the teeth have begun to be repositioned). In some variations, the IPR apparatus may be used to perform IPR after moving the teeth to a position that provides greater access to the interproximal region. Thus, in general, the apparatuses described herein may be configured to fit snugly over the patient's teeth corresponding to the position of the patient's teeth when the IPR is to be performed. This position may be determined by scanning directly or may be inferred base on the projected/predicted position for the treatment plan. In any of the variations described herein, the scan may be a scan of the patient's teeth and/or a scan derived from an impression of the patient's teeth (e.g., a model of the patient's teeth). In some variations, multiple apparatuses may be used. For example, a first interproximal reduction apparatus, having a first guide slot (or first set of guide slots) may be used. Multiple interproximal reduction guide devices may be used for a single treatment stage (e.g., reducing the same teeth from different angles, or other reducing additional teeth), and/or multiple interproximal reduction guide devices may be used at different stages.

Figure 9:
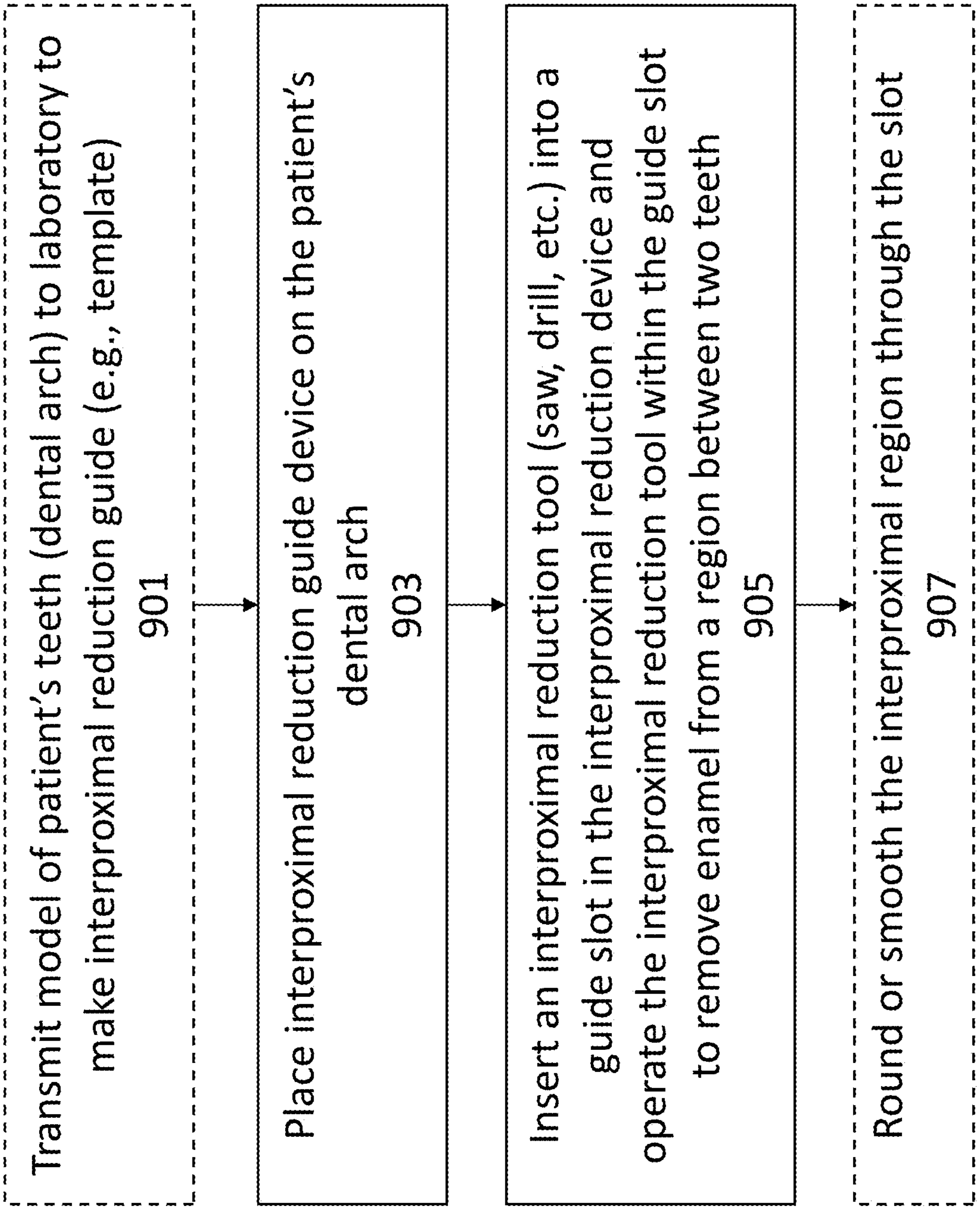
FIG. 9 is a flow chart schematically illustrating a method of treating a patient with an interproximal reduction guide apparatus as described herein.

FIG. 9 schematically illustrates one method in which the interproximal reduction guide apparatus may be used. In FIG. 9, the method shown is a method of enlarging a patient's interproximal space by interproximal reduction, using an interproximal reduction guide apparatus. As an optional first step, the method may include transmitting a model of the patient's dentition (e.g., dental arch) to a laboratory to make the interproximal reduction guide, as just described 901. Once the interproximal reduction guide is received by the dental professional, the dental professional may place the interproximal reduction guide onto the patient's teeth so that the patient's teeth are secured within an inner channel of the interproximal reduction guide device 903. The physician may verify that the device is securely on the teeth as mentioned above, e.g., by observing the occlusal surface of the teeth through one or more windows in the device. Thereafter, an interproximal reduction tool may be inserted into a guide slot in the interproximal reduction device 905 and operated within the guide slot to remove enamel from a region between two teeth. Optionally, the tooth may be smoothed or rounded through the guide slot 907 using the same IPR cutting tool or a different tool.

Any of the methods (including user interfaces) described herein may be automated or semi-automated, including being implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An interproximal reduction guide device comprising:

a body comprising a lingual surface, a buccal surface, an occlusal surface, and a channel, wherein the channel includes a plurality of chambers configured to conform to an outer surface of a patient's teeth; and a guide slot extending through the occlusal surface and partially into the buccal and lingual surfaces between two adjacent chambers of the plurality of chambers, wherein the two adjacent chambers are shaped to accept teeth identified for interproximal reduction, wherein the guide slot is configured to limit motion of an interproximal reduction tool inserted into the guide slot.

2. The device of claim 1, wherein at least a portion of the body surrounding the guide slot is reinforced to resist cutting by the interproximal reduction tool.

3. The device of claim 2, wherein the at least a portion of the body surrounding the guide slot is made of a stiffer material than another portion of the body.

4. The device of claim 2, wherein the at least a portion of the body surrounding the guide slot includes a reinforcement layer or a reinforcement coating.

5. The device of claim 1, wherein a distance between an end of the guide slot and the patient's gingiva when the device is worn on the patient's teeth is a predetermined distance.

6. The device of claim 5, wherein the predetermined distance is 0.5 mm or greater.

7. The device of claim 1, wherein the guide slot has a maximum width ranging from 0.1 mm and 5 mm.

8. The device of claim 1, wherein the body includes one or more windows configured to allow visualization of the patient's teeth within the channel.

9. The device of claim 8, wherein the one or more windows allows visualization through the occlusal surface of the body.

10. The device of claim 1, wherein the body comprises a material that is configured to resist cutting by the interproximal reduction tool.

11. The device of claim 1, wherein at least a portion of the body is made of one or more of ceramic, zirconium, and porcelain.

12. A method of forming an interproximal reduction guide, the method comprising:

accessing a model of a patient's dental arch, wherein the model includes a pair of adjacent teeth identified for interproximal reduction; and generating the interproximal reduction guide from the model of the patient's dental arch, wherein the interproximal reduction guide comprises a body including a lingual surface, a buccal surface, an occlusal surface, and a channel, wherein the channel includes a plurality of chambers configured to conform to an outer surface of a patient's teeth, wherein the body further comprises a guide slot that extends through the occlusal surface and partially into the buccal and lingual surfaces between two adjacent chambers of the plurality of chambers, wherein the two adjacent chambers are shaped to accept the pair of adjacent teeth identified for interproximal reduction, further wherein the guide slot is configured to limit motion of an interproximal reduction tool inserted into the guide slot.

13. The method of claim 12, wherein the model is a digital model of the patient's dental arch.

14. The method of claim 13, wherein generating the interproximal reduction guide comprises generating a digital representation of the interproximal reduction guide from the digital model of the patient's dental arch.

15. The method of claim 12, wherein the model is a physical model of the patient's dental arch.

16. The method of claim 12, wherein generating the interproximal reduction guide comprises forming the interproximal reduction guide from one or more of ceramic, zirconium, and porcelain.

17. The method of claim 12, wherein generating the interproximal reduction guide comprises fabricating the interproximal reduction guide using one or both of: milling and three-dimensional (3D) printing.

18. The method of claim 12, wherein the guide slot extends into the buccal and lingual surfaces by a predetermined depth for avoiding gingival abrasion by the interproximal reduction tool.

19. An interproximal reduction guide device comprising:

a body comprising a lingual surface, a buccal surface, an occlusal surface, and a channel, wherein the channel includes a plurality of chambers configured to conform to an outer surface of a patient's teeth; and a guide slot extending through the occlusal surface and partially into the buccal and lingual surfaces between two adjacent chambers of the plurality of chambers, wherein the two adjacent chambers are shaped to accept teeth identified for interproximal reduction, wherein the guide slot is configured to limit motion of an interproximal reduction tool inserted into the guide slot, further wherein the guide slot extends into the buccal and lingual surfaces by a predetermined depth for avoiding gingival abrasion by the interproximal reduction tool.

* * * * *